United States Patent
Cao et al.

(10) Patent No.: US 11,816,766 B2
(45) Date of Patent: Nov. 14, 2023

(54) SUPER-RESOLUTION X-RAY SHADOWGRAPH SYSTEM AND IMAGING METHOD THEREFOR

(71) Applicant: Shenzhen Technology University, Shenzhen (CN)

(72) Inventors: LeiFeng Cao, Shenzhen (CN); Jian Yu, Shenzhen (CN); Xue Wang, Shenzhen (CN); Jialing Deng, Shenzhen (CN); Dikai Li, Shenzhen (CN); Yanmeng Dai, Shenzhen (CN); Chunhui Zhang, Shenzhen (CN); Cangtao Zhou, Shenzhen (CN); Shuangchen Ruan, Shenzhen (CN)

(73) Assignee: SHENZHEN TECHNOLOGY UNIVERSITY, Shenzhen (CN)

( * ) Notice: Subject to any disclaimer, the term of this patent is extended or adjusted under 35 U.S.C. 154(b) by 0 days.

(21) Appl. No.: 18/123,387

(22) Filed: Mar. 20, 2023

(65) Prior Publication Data
US 2023/0306658 A1    Sep. 28, 2023

(30) Foreign Application Priority Data
Mar. 25, 2022   (CN) .......................... 202210306053.0

(51) Int. Cl.
| | |
|---|---|
| *G06T 11/00* | (2006.01) |
| *G01N 23/04* | (2018.01) |
| *G01N 23/083* | (2018.01) |

(52) U.S. Cl.
CPC ............ *G06T 11/006* (2013.01); *G01N 23/04* (2013.01); *G01N 23/083* (2013.01); *G01N 2223/401* (2013.01); *G06T 2210/41* (2013.01)

(58) Field of Classification Search
CPC ... G06T 11/006; G06T 2210/41; G01N 23/04; G01N 23/083; G01N 2223/401
See application file for complete search history.

(56) References Cited

U.S. PATENT DOCUMENTS

| | | | |
|---|---|---|---|
| 2015/0084622 A1* | 3/2015 | Yano ...................... | G01N 27/72 324/228 |
| 2015/0248943 A1 | 9/2015 | Handa | |

FOREIGN PATENT DOCUMENTS

CN            102735700 A      10/2012

OTHER PUBLICATIONS

CNIPA, Notification of a First Office Action for CN202210306053.0, dated Aug. 15, 2022.

(Continued)

*Primary Examiner* — Courtney D Thomas
(74) *Attorney, Agent, or Firm* — Zhigang Ma

(57) ABSTRACT

A super-resolution X-ray shadowgraph system includes an X-ray source, a sample stage, an X-ray detector and an image reconstruction device, which are arranged in sequence. Geometric centers of the X-ray source, the sample stage and the X-ray detector are collinear. The geometric center of the sample stage is provided with a through hole for placing a testing sample, the X-ray source is used for providing X-rays, and the X-rays penetrate the sample stage to form an image on the X-ray detector. The image reconstruction device is used for acquiring the image and performing an image reconstruction on the image to obtain a new image. The shadowgraph system and the imaging method therefor can overcome a deficiency of a lower resolution of the image limited by a size of the source, thereafter obtaining a clear shadowgraph with a high resolution.

6 Claims, 4 Drawing Sheets

(56) References Cited

OTHER PUBLICATIONS

Shenzhen Technology University (Applicant), Reply to Notification of a First Office Action for CN202210306053.0, w/ replacement claims, dated Sep. 27, 2022.
Shenzhen Technology University (Applicant), Supplemental Reply to Notification of a First Office Action for CN202210306053.0, w/ (allowed)replacement claims, dated Oct. 28, 2022.
CNIPA, Notification to grant patent right for invention in CN202210306053.0, dated Nov. 3, 2022.

\* cited by examiner

SUPER-RESOLUTION X-RAY SHADOWGRAPH SYSTEM AND IMAGING METHOD THEREFOR

TECHNICAL FIELD

The disclosure relates to the field of X-ray technologies, particularly to a super-resolution X-ray shadowgraph system and an imaging method therefor.

BACKGROUND

X-rays have already applied into all of walks of life of social economy and all of aspects of the life in public, and have played a great role in improving the quality of human life and helping people understand the objective world. The X-rays have strong penetration, thereby being of great importance in medical diagnosis, pump-probe technique, phase contrast imaging, etc. Nowadays, with the rapid development of science and technology, the application of high-energy X-rays also requires higher properties of X-ray imaging technologies.

The X-rays have the properties such as penetration, fluorescence effect and photographic effect. Therefore, when the X-rays pass through materials with different densities and thicknesses, some of X-rays photons are attenuated because of different absorption levels of the materials, which can present a phenomenon of different grayscale values. Furthermore, the public puts forward X-ray radiography as a non-destructive testing method.

The X-ray radiography is the most basic and widely used radiographic testing method. It is widely used in the non-destructive testing, non-destructive evaluation and reverse engineering of products and systems in the fields of medical treatment, aviation technology, aerospace technology, weapon manufacturing, nuclear energy, automobile, and other fields. Testing objects of the X-ray radiography include missiles, rocket engines, nuclear waste, circuit boards, engine blades, automobile engine cylinders, tire hubs, etc., playing an extremely important role in medical diagnosis, engineering quality supervision and quality assurance of products.

However, with the continuous improvement of science and technology, the measurements in medical, industrial and scientific fields have put forward higher requirements for the resolution of X-ray shadowgraph technology. In order to obtain high-resolution X-ray image, a size of source must be smaller. The size of the source limits the further development of the resolution of X-ray shadowgraph technology.

SUMMARY

An objective of the disclosure is to provide a super-resolution X-ray shadowgraph system and an imaging method therefor to overcome the limitation of the size of the source on the resolution of the image, thereby obtaining a clear and high-resolution X-ray shadow image.

Technical solutions of the disclosure to solve the above described problems are as follows.

The disclosure provides a super-resolution X-ray shadowgraph system, and the super-resolution X-ray shadowgraph system includes an X-ray source, a sample stage, an X-ray detector and an image reconstruction device, sequentially arranged in that order. Geometric centers of the X-ray source, the sample stage, and the X-ray detector are collinear. The geometric center of the sample stage is provided with a through hole for placing a testing sample, the X-ray source is configured to provide X-rays, and the X-rays are capable of penetrating the sample stage to form an image on the X-ray detector. The image reconstruction device is configured to obtain the image and to perform an image reconstruction on the image to form a new image.

In an embodiment, each of the X-ray source, the sample stage and the X-ray detector is provided with an optical bracket and the optical bracket is telescopic along a height direction of the optical bracket.

In an embodiment, a distance between the sample stage and the X-ray detector is adjustable along a direction of setting the X-ray source, the sample stage and the X-ray detector.

In an embodiment, a gap is defined between a diameter of the through hole and the testing sample.

The disclosure provides an imaging method based on the above super-resolution X-ray shadowgraph system, and the imaging method includes the following steps:

controlling the X-ray source to emit X-rays to the testing sample;

obtaining the image of the testing sample on the X-ray detector; and performing the image reconstruction on the image to obtain the new image.

In an embodiment, performing the image reconstruction on the image includes the following steps:

controlling the X-ray source to emit X-rays to penetrate the through hole in the sample stage;

obtaining an original image on the X-ray detector formed by the X-rays penetrating the through hole;

performing Fourier transform on pixel coordinates of the through hole, the original image and the image to obtain transformed pixel coordinates of the through hole, a transformed image of the original image, and a transformed image of the image;

performing an inverse convolution on the transformed pixel coordinates of the through hole, the transformed image of the original image, and the transformed image of the image to obtain a decoded image of the testing sample in a Fourier space; and performing an inverse Fourier transform on the decoded image to obtain the new image.

In an embodiment, the performing an inverse convolution on the transformed pixel coordinates of the through hole, the transformed image of the original image, and the transformed image of the image to obtain a decoded image of the testing sample in a Fourier space includes using a transform formula expressed as follows:

FT=FHT./FHA.*FA, where FT represents the decoded image of the testing sample in the Fourier space, FA represents the transformed pixel coordinates of the through hole, FHT represents the transformed image of the original image, and FHA represents the transformed image of the image.

The disclosure has the advantages as follows. The image reconstruction device can perform the image reconstruction on the obtained image through the above technical solutions, namely, through the super-resolution X-ray shadowgraph system and the imaging method therefor provided by the disclosure, thereby making the new image clearer than the obtained image and the new image being with a higher resolution, and further overcoming the lower resolution of the image limited by the size of the source.

DESCRIPTION OF REFERENCE NUMERALS

1-X-ray source; 2-sample stage; 3-testing sample; 4-X-ray detector; 5-image; 6-through hole; 7-gap.

DETAILED DESCRIPTION OF EMBODIMENTS

Principles and features of the disclosure are described below in combination with attached drawings. Embodiments described below are only used to explain the disclosure, not to limit the protection scope of the disclosure.

The embodiments of the disclosure are as follows.

A technical solution of the disclosure to solve the above described problems.

Figure 1:
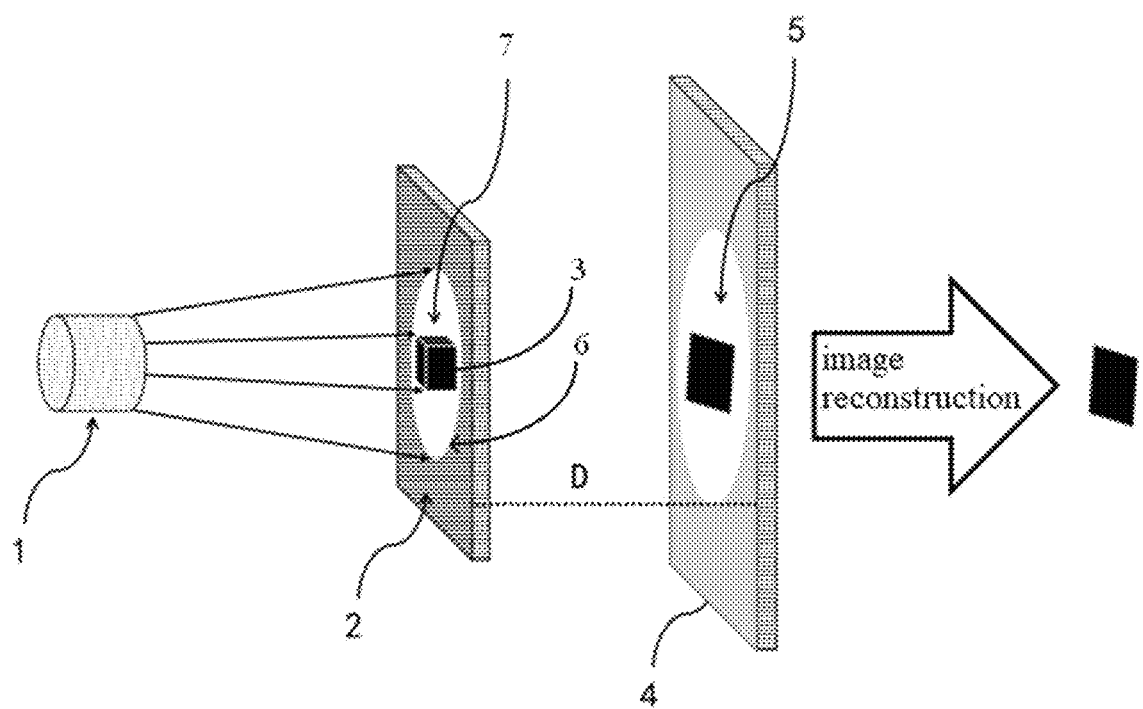
FIG. 1 illustrates a schematic structural diagram of a super-resolution X-ray shadowgraph system according to an embodiment of the disclosure.

Referring to FIG. 1, a super-resolution X-ray shadowgraph system is provided by the disclosure. The super-resolution X-ray shadowgraph system includes an X-ray source 1, a sample stage 2, an X-ray detector 4 and an image reconstruction device (not shown in figures), which are arranged in sequence. The image reconstruction device may be a computer capable of performing the inverse convolution. Geometric centers of the X-ray source 1, the sample stage 2, and the X-ray detector 4 are collinear. The geometric center of the sample stage 2 is provided with a through hole 6 for placing a testing sample 3. The X-ray source 1 is used to provide X-rays, and the X-rays are capable of penetrating the sample stage 2 to form an image 5 on the X-ray detector 4. The image reconstruction device is used to obtain the image 5 and to perform an image reconstruction on the image 5 to form a new image.

In an illustrated embodiment, the X-ray source 1, the sample stage 2, and the X-ray detector 4 is correspondingly provided with an optical bracket and the optical bracket is telescopic along a height direction of the optical bracket.

The above settings can adjust heights of the X-ray source 1, the sample stage 2 and the X-ray detector 4 according to actual needs during generating the image 5, thereby ensuring that the geometric centers of the X-ray source 1, the sample stage 2 and the X-ray detector 4 are collinear.

In order to ensure that different sizes of images can be obtained, the distance (also referred to 'D' as shown in FIG. 1) between the sample stage 2 and the X-ray detector 4 provided by the disclosure is adjustable. In other words, the sample stage 2 is movable and/or the X-ray detector 4 is movable along a direction of setting the X-ray source 1, the sample stage 2 and the X-ray detector 4, thereby changing an imaging ratio.

In general, the X-ray radiography uses a pinhole to catch an image, and the image is not clear because of insufficient luminous flux. Therefore, the disclosure defines a gap between the through hole 6 and the testing sample 3. In other words, the through hole 6 provided in the disclosure is large enough to enable the X-rays to be projected onto the X-ray detector 4 through the gap defined between the through hole 6 and the testing sample 3, thereby ensuring the sufficient luminous flux.

Figure 2:
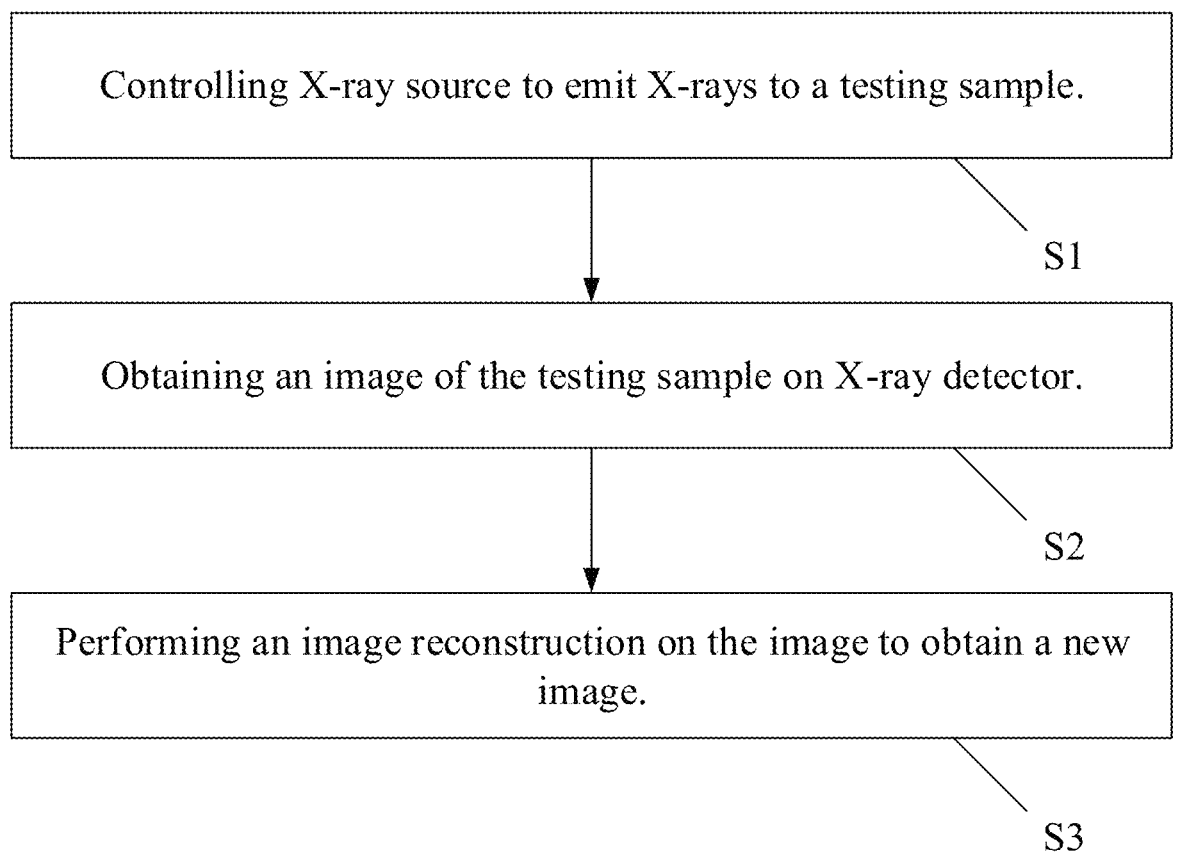
FIG. 2 illustrates a flowchart of an imaging method for the super-resolution X-ray shadowgraph system according to an embodiment of the disclosure.

The disclosure further provides an imaging method for the super-resolution X-ray shadowgraph system. And referring to FIG. 2, the imaging method includes the following steps:

S1, controlling the X-ray source 1 to emit X-rays to the testing sample 3;

S2, obtaining the image 5 of the testing sample 3 on the X-ray detector 4.

Figure 3:
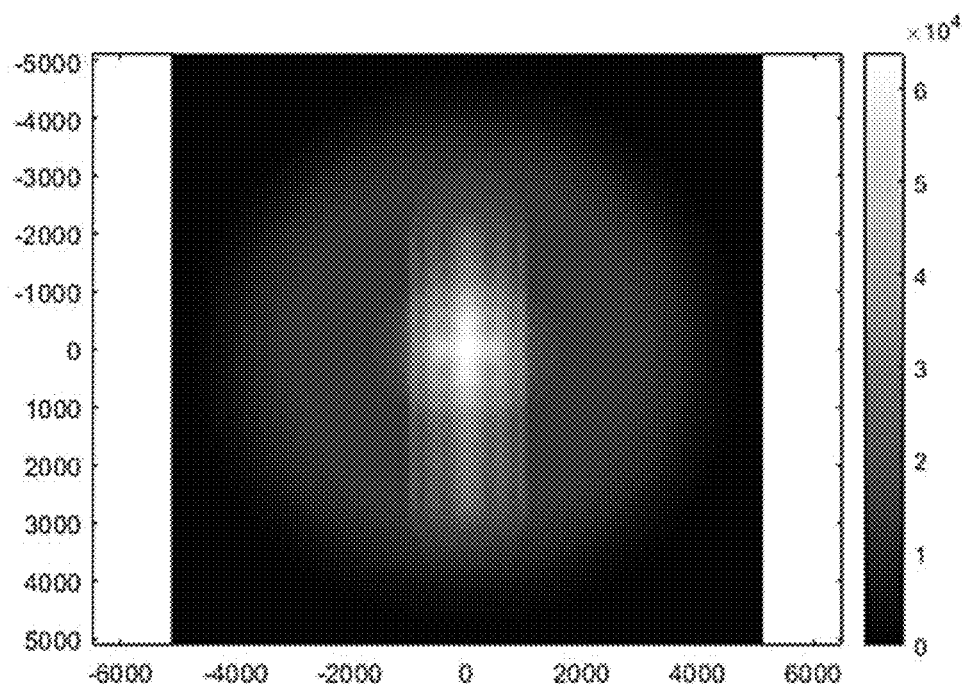
FIG. 3 illustrates a schematic diagram of an image of a testing sample on an X-ray detector.

However, the size of the testing sample 3 cannot be fully satisfied with that of the through hole 6 in the sample stage 2, so that when the image 5 of the testing sample 3 is generated, some of the X-rays also generate an image. Namely, the image 5 generated on the X-ray detector 4 is a superimposed image of the X-rays, the through hole 6 and the testing sample 3 as shown in FIG. 3, which cannot ensure the clarity of the image 5. Therefore, after the step S2, the imaging method further includes: S3, performing an image reconstruction on the image 5 to obtain a new image.

Figure 4:
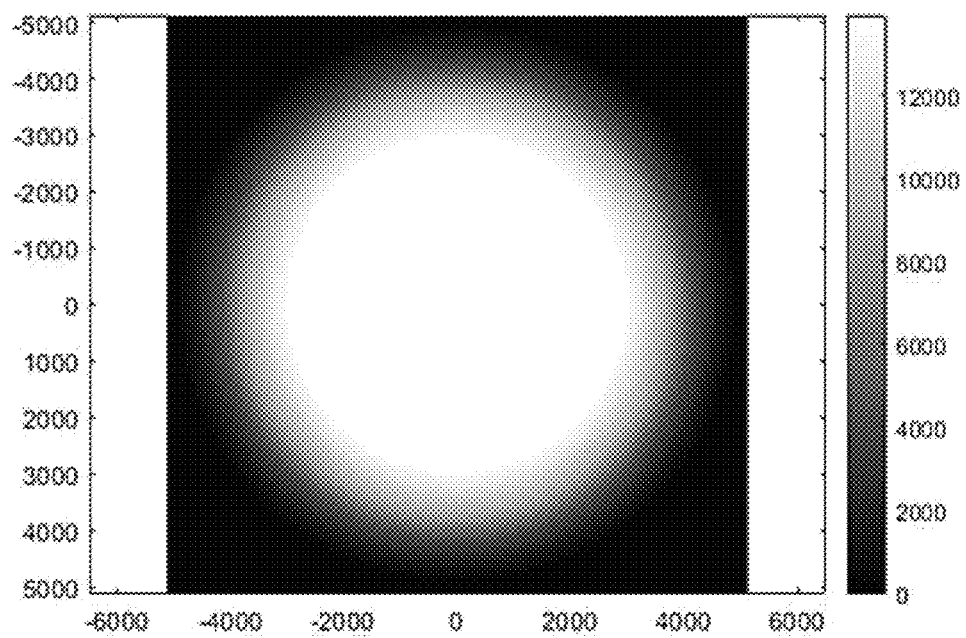
FIG. 4 illustrates a schematic diagram of an original image on the X-ray detector formed by X-rays penetrating a through hole on a sample stage.
Figure 5:
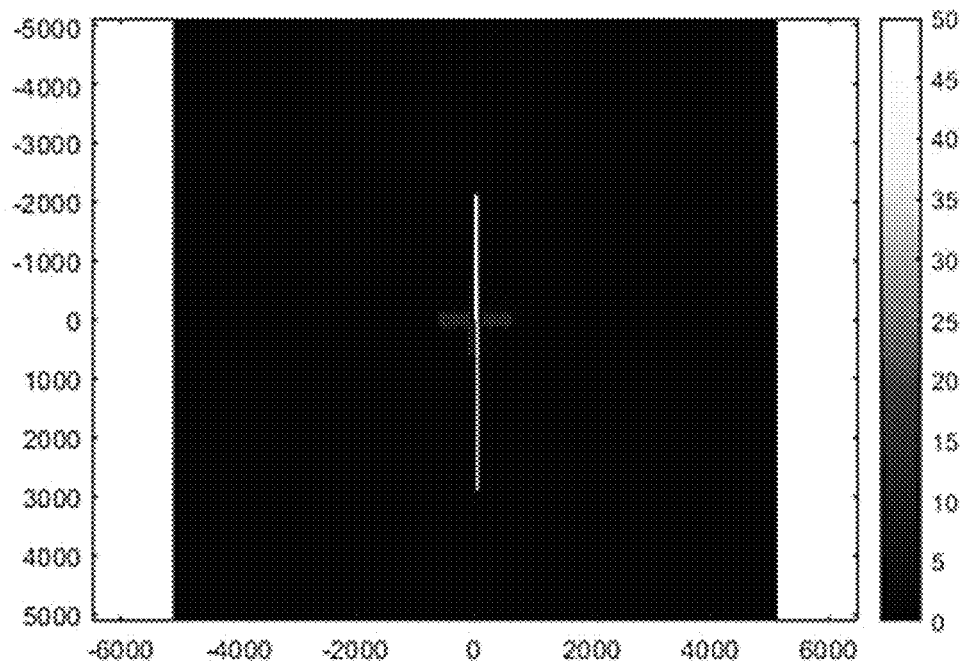
FIG. 5 illustrates a schematic diagram of a new image.
Figure 6:
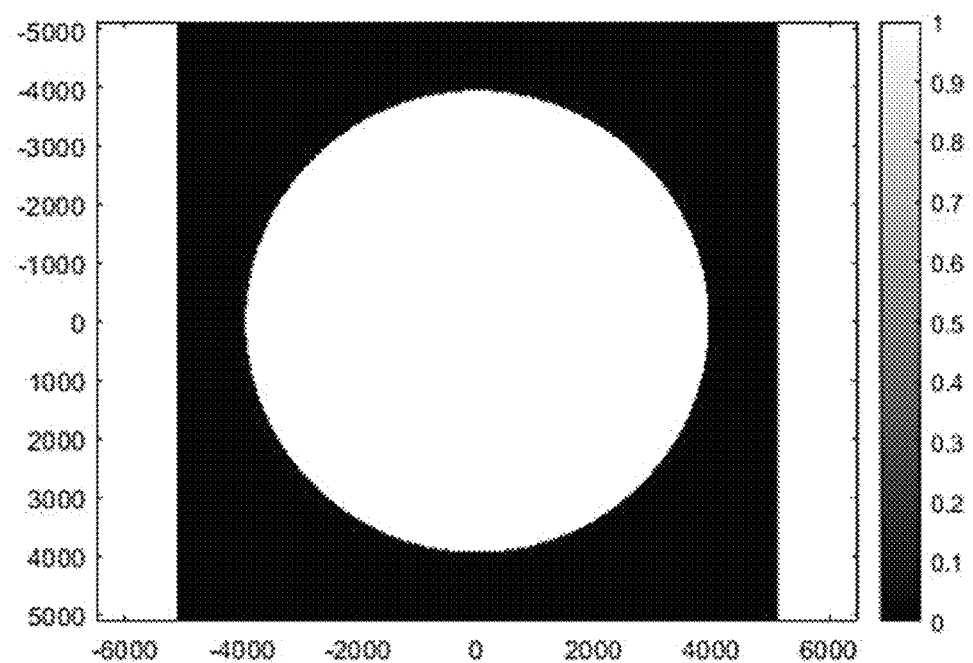
FIG. 6 illustrates a schematic diagram of the through hole on the sample stage.

In an illustrated embodiment, the performing an image reconstruction on the image 5 includes the following steps:

controlling the X-ray source 1 to emit X-rays to penetrate the through hole 6 in the sample stage 2;

obtaining an original image on the X-ray detector 4 formed by the X-rays penetrating the through hole 6; such that, as shown in FIG. 4, the original image is a superimposed image of the X-rays and the through hole 6;

performing Fourier transform on pixel coordinates of the through hole 6, the original image and the image 5 to obtain transformed pixel coordinates of the through hole 6, a transformed image of the original image, and a transformed image of the image 5;

performing an inverse convolution on the transformed pixel coordinates of the through hole 6, the transformed image of the original image, and the transformed image of the image 5 to obtain a decoded image of the testing sample 3 in a Fourier space; and performing an inverse Fourier transform on the decoded image to obtain the new image as shown in FIG. 5.

In an illustrated embodiment, the performing an inverse convolution on the transformed pixel coordinates of the through hole 6, the transformed image of the original image, and the transformed image of the image 5 to obtain a decoded image of the testing sample 3 in a Fourier space includes using a transform formula expressed as follows:

$$FT = FHT./FHA.*FA.$$

In the transform formula, FT represents the decoded image of the testing sample 3 in the Fourier space, FA represents the transformed pixel coordinates of the through hole 6, FHT represents the transformed image of the original image, and FHA represents the transformed image of the image 5.

The disclosure has the advantages as follows.

The image reconstruction device can perform the image reconstruction on the image 5 through the above technical solutions, namely, through the super-resolution X-ray shadowgraph system and the imaging method therefor, thereby making the new image clearer than the image 5 and the new image being with a higher resolution, and further overcoming the lower resolution of the image 5 limited by the size of the source.

The above description is only the illustrated embodiment of the disclosure and is not intended to limit the disclosure. Any modification, equivalent replacement, improvement, and etc. made within the spirit and principle of the disclosure shall be included in the protection scope of the disclosure.

What is claimed is:

1. A super-resolution X-ray shadowgraph system, wherein the super-resolution X-ray shadowgraph system comprises: an X-ray source, a sample stage, an X-ray detector and an image reconstruction device, sequentially arranged in that order; and geometric centers of the X-ray source, the sample stage, and the X-ray detector are collinear; the geometric center of the sample stage is provided with a through hole for placing a testing sample, the X-ray source is configured to provide X-rays, and the X-rays are capable of penetrating the sample stage to form a first image on the X-ray detector, the image reconstruction device is configured to obtain the first image and to perform an image reconstruction on the first image to obtain a second image; and a gap is defined between the through hole and the testing sample.

2. The super-resolution X-ray shadowgraph system according to claim 1, wherein each of the X-ray source, the sample stage and the X-ray detector is provided with an optical bracket and the optical bracket is telescopic along a height direction of the optical bracket.

3. The super-resolution X-ray shadowgraph system according to claim 1, wherein a distance between the sample stage and the X-ray detector is adjustable along a direction of setting the X-ray source, the sample stage and the X-ray detector.

4. An imaging method for the super-resolution X-ray shadowgraph system according to claim 1, wherein the imaging method comprises:

controlling the X-ray source to emit the X-rays to the testing sample;

obtaining the first image of the testing sample on the X-ray detector; and performing the image reconstruction on the first image to obtain the second image.

5. The imaging method according to claim 4, wherein the performing the image reconstruction on the first image comprises:

controlling the X-ray source to emit X-rays to penetrate the through hole;

obtaining an original image on the X-ray detector formed by the X-rays penetrating the through hole;

performing Fourier transform on pixel coordinates of the through hole, the original image and the first image to obtain transformed pixel coordinates of the through hole, a transformed image of the original image, and a transformed image of the first image;

performing an inverse convolution on the transformed pixel coordinates of the through hole, the transformed image of the original image, and the transformed image of the first image to obtain a decoded image of the testing sample in a Fourier space; and performing an inverse Fourier transform on the decoded image to obtain the second image.

6. The imaging method according to claim 5, wherein the performing an inverse convolution on the transformed pixel coordinates of the through hole, the transformed image of the original image, and the transformed image of the first image to obtain a decoded image of the testing sample in a Fourier space comprises using a transform formula expressed as follows:

$$FT = FHT./FHA/*FA,$$

where FT represents the decoded image of the testing sample in the Fourier space, FA represents the transformed pixel coordinates of the through hole, FHT represents the transformed image of the original image, and FHA represents the transformed image of the first image.

* * * * *